(12) United States Patent
Khongbantabam

(10) Patent No.: US 11,381,105 B2
(45) Date of Patent: Jul. 5, 2022

(54) CLASSIFICATION OF UTILITY USAGE DATA

(71) Applicant: Fortum Oyj, Espoo (FI)

(72) Inventor: Nabakumar Singh Khongbantabam, Espoo (FI)

(73) Assignee: Fortum Oyj, Espoo (FI)

(*) Notice: Subject to any disclaimer, the term of this patent is extended or adjusted under 35 U.S.C. 154(b) by 882 days.

(21) Appl. No.: 16/210,047

(22) Filed: Dec. 5, 2018

(65) Prior Publication Data
US 2019/0173312 A1 Jun. 6, 2019

(30) Foreign Application Priority Data
Dec. 5, 2017 (EP) .................................... 17205468

(51) Int. Cl.
| | |
|---|---|
| *H02J 9/00* | (2006.01) |
| *G01D 4/00* | (2006.01) |
| *G06Q 50/06* | (2012.01) |
| *H02J 1/14* | (2006.01) |

(52) U.S. Cl.
CPC .............. *H02J 9/002* (2013.01); *G01D 4/004* (2013.01); *G06Q 50/06* (2013.01); *H02J 1/14* (2013.01); *H04Q 2209/60* (2013.01)

(58) Field of Classification Search
CPC ........ G06Q 50/06; H02J 1/04; H04Q 2209/60
USPC ....................................................... 700/295
See application file for complete search history.

(56) References Cited

U.S. PATENT DOCUMENTS

| | | | | |
|---|---|---|---|---|
| 8,855,829 | B2* | 10/2014 | Golden | ..................... G06N 5/04 |
| | | | | 700/291 |
| 9,417,092 | B2 | 8/2016 | Srinivasan et al. | |
| 10,074,097 | B2* | 9/2018 | Packer | ..................... G06F 16/35 |
| 10,855,077 | B2* | 12/2020 | Davies | ................. H04L 67/1042 |
| 2010/0064379 | A1* | 3/2010 | Cassett | .................. H04W 12/12 |
| | | | | 726/34 |
| 2013/0110621 | A1 | 5/2013 | Gupta et al. | |
| 2013/0124465 | A1* | 5/2013 | Pingel | ................... G06F 3/0604 |
| | | | | 707/610 |
| 2014/0172772 | A1 | 6/2014 | Sanchez Loureda | |
| 2016/0285872 | A1 | 9/2016 | Polar et al. | |
| 2017/0329323 | A1* | 11/2017 | Kopp | ................. H02J 13/00022 |
| 2018/0060334 | A1* | 3/2018 | Jensen | ..................... G06F 12/00 |
| 2018/0204293 | A1* | 7/2018 | Bazhinov | ............... H01H 89/06 |

FOREIGN PATENT DOCUMENTS

| | | |
|---|---|---|
| DE | 112012002121 T5 | 2/2014 |
| WO | WO2011058328 A2 | 5/2011 |

* cited by examiner

*Primary Examiner* — Md Azad
(74) *Attorney, Agent, or Firm* — Laine IP Oy

(57) ABSTRACT

According to an example aspect of the present invention, there is provided an apparatus comprising a memory configured to store classifier parameters, and at least one processing core configured to use a classifier and the classifier parameters to determine a category of least one data composition, the at least one data composition comprising utility usage information concerning a utility unit, the category comprising a life condition present in the at least one utility unit.

17 Claims, 6 Drawing Sheets

CLASSIFICATION OF UTILITY USAGE DATA

FIELD

The present invention relates to operation of a utility delivery mechanism, such as, for example, an electrical grid.

BACKGROUND

Utility delivery networks may be used to deliver a utility, such as electricity, water, heat, data connectivity or gas to utility units, where the utilities are consumed. For example, a house, an apartment or another kind of home may be connected to district heat, the electrical grid, an Internet optical fibre and a gas delivery network to provide inhabitants with the kind of versatile functions that are expected from homes.

Utility usage may be measured at the site of usage, that is, at the utility unit, using a remotely readable meter, for example. Alternatively, utility usage may be metered remotely, such as at an Internet Service Provider, ISP, which may keep count of a quantity of data transferred over a subscription. Measuring the usage of a utility may be used when billing or limiting the use of the utility, for example.

Examples of utility units include, in addition to homes, medical or industrial facilities and businesses, for example. Different kinds of utility units may subscribe to different kinds of utilities, and even within a same kind of utility unit, different kinds of utilities may be subscribed to, depending on the unit. For example, some homes use district gas while others do not use gas, relying instead on electric power for preparing food.

Some utility units, such as hospitals, employ on-site diesel generators which are configured to start responsive to an interruption in the electrical grid. This may be necessary, since electrical grid interruptions may occur at unexpected times, and a hospital may provide surgical operations and other procedures, which need an electrical power supply and which cannot safely be interrupted.

Other utility units, such as businesses, may employ so-called uninterruptible power supplies, UPS, which store a quantity of electrical energy which allows computer systems to continue operation, in the event of electrical grid interruption, for a time which is sufficient to save ongoing work products, for example.

SUMMARY OF THE INVENTION

According to some aspects, there is provided the subject-matter of the independent claims. Some embodiments are defined in the dependent claims.

According to a first aspect of the present invention, there is provided an apparatus comprising a memory configured to store classifier parameters, and at least one processing core configured to use a classifier and the classifier parameters to determine a category of least one data composition, the at least one data composition comprising utility usage information concerning a utility unit, the category comprising a life condition present in the at least one utility unit.

Various embodiments of the first aspect may comprise at least one feature from the following bulleted list:
- the apparatus is further configured to trigger a modification in a utility delivery network as a response to the determined category
- the at least one processing core is further configured to use, by the classifier, supplementary information along with the classifier parameters in determining the category
- the supplementary information comprises at least one of the following: weather information, regional information, demographic information, age information, income information, social media information, third-party consumer information, Internet use information and sensor data originating in at least one sensor in the utility unit
- the modification in the utility delivery network comprises either prioritizing higher the utility unit, thereby decreasing risk that the utility unit experiences an interruption in receiving the utility, or prioritizing lower the utility unit
- the prioritizing comprises allocating remaining resources to the utility unit in case of a failure condition that reduces a baseline amount of deliverable utility resources
- the modification in the utility delivery network comprises interrupting delivery of the utility to the utility unit
- the utility unit comprises at least one of a home, an industrial facility, a business and a medical facility
- the life condition comprises at least one of: whether the utility unit is occupied by humans, whether humans in the utility unit are healthy, whether the utility unit is occupied by a teen-aged human, whether the utility unit is occupied by at least one toddler, whether humans in the utility unit watch television in excess of a first threshold time per day, whether humans in the utility unit play video games in excess of a second threshold time per day, whether humans inhabiting the utility unit are employed outside of the utility unit, whether humans in the utility unit own an electric vehicle and a utility non-interruption priority condition
- the utility usage comprises usage of at least one of: electricity, water, heat, data connectivity and gas
- the classifier is comprised in the following list: a support vector machine, an artificial neural network, a linear classifier, a quadratic classifier, a kernel estimator, a decision tree, a K-nearest neighbour classifier, a random forest, and a Bayesian network.

According to a second aspect of the present invention, there is provided a method comprising storing classifier parameters, and using a classifier and the classifier parameters to determine a category of least one data composition, the at least one data composition comprising utility usage information concerning a utility unit, the category comprising a life condition present in the at least one utility unit.

Various embodiments of the second aspect may comprise at least one feature from the following bulleted list:
- triggering a modification in a utility delivery network as a response to the determined category
- using, by the classifier, supplementary information along with the classifier parameters in determining the category
- the supplementary information comprises at least one of the following: weather information, regional information, demographic information, age information, income information, social media information, third-party consumer information, Internet use information and sensor data originating in at least one sensor in the utility unit
- the modification in the utility delivery network comprises either prioritizing higher the utility unit, thereby decreasing risk that the utility unit experiences an interruption in receiving the utility, or prioritizing lower the utility unit the prioritizing comprises allocating remaining resources to the utility unit in case of a failure condition that reduces a baseline amount of deliverable utility resources the modification in the utility delivery network comprises interrupting delivery of the utility to the utility unit the utility unit comprises at least one of a home, an industrial facility, a business and a medical facility the life condition comprises at least one of: whether the utility unit is occupied by humans, whether humans in the utility unit are healthy, whether the utility unit is occupied by a teen-aged human, whether the utility unit is occupied by at least one toddler, whether humans in the utility unit watch television in excess of a first threshold time per day, whether humans in the utility unit play video games in excess of a second threshold time per day, whether humans inhabiting the utility unit are employed outside of the utility unit, whether humans in the utility unit own an electric vehicle and a utility non-interruption priority condition the utility usage comprises usage of at least one of: electricity, water, heat, data connectivity and gas the classifier is comprised in the following list: a support vector machine, an artificial neural network, a linear classifier, a quadratic classifier, a kernel estimator, a decision tree, a K-nearest neighbour classifier, a random forest, and a Bayesian network.

According to a third aspect of the present invention, there is provided an apparatus comprising a memory configured to store classifier parameters, and at least one processing core configured to use a classifier and training data to optimize the classifier parameters, to thereby train the classifier to determine categories of data compositions which comprise utility usage information concerning a utility unit, the categories comprising life conditions present in the utility unit.

According to a fourth aspect of the present invention, there is provided a method comprising storing classifier parameters, and using a classifier and training data to optimize the classifier parameters, to thereby train the classifier to determine categories of data compositions which comprise utility usage information concerning a utility unit, the categories comprising life conditions present in the utility unit.

According to a fifth aspect of the present invention, there is provided an apparatus comprising means for storing classifier parameters, and means for using a classifier and the classifier parameters to determine a category of least one data composition, the at least one data composition comprising utility usage information concerning a utility unit, the category comprising a life condition present in the at least one utility unit.

According to a sixth aspect of the present invention, there is provided a non-transitory computer readable medium having stored thereon a set of computer readable instructions that, when executed by at least one processor, cause an apparatus to at least store classifier parameters, and use a classifier and the classifier parameters to determine a category of least one data composition, the at least one data composition comprising utility usage information concerning a utility unit, the category comprising a life condition present in the at least one utility unit.

According to a seventh aspect of the present invention, there is provided a computer program configured to cause a method in accordance with either one of the second or the fourth aspects to be performed.

EMBODIMENTS

In a utility delivery network, benefits may be obtained from being able to identify life conditions which relate to utility units, such as homes or businesses. For example, a home which is classified as a home with a medical patient who requires uninterrupted mains electrical power may be prioritized to continue receiving electrical power in case of a fault condition which prevents providing power to all homes in the area. Classification may be based on machine learning, which may use, optionally, in addition to metered utility usage data, also supplementary information concerning the utility unit or persons therein.

Figure 1:
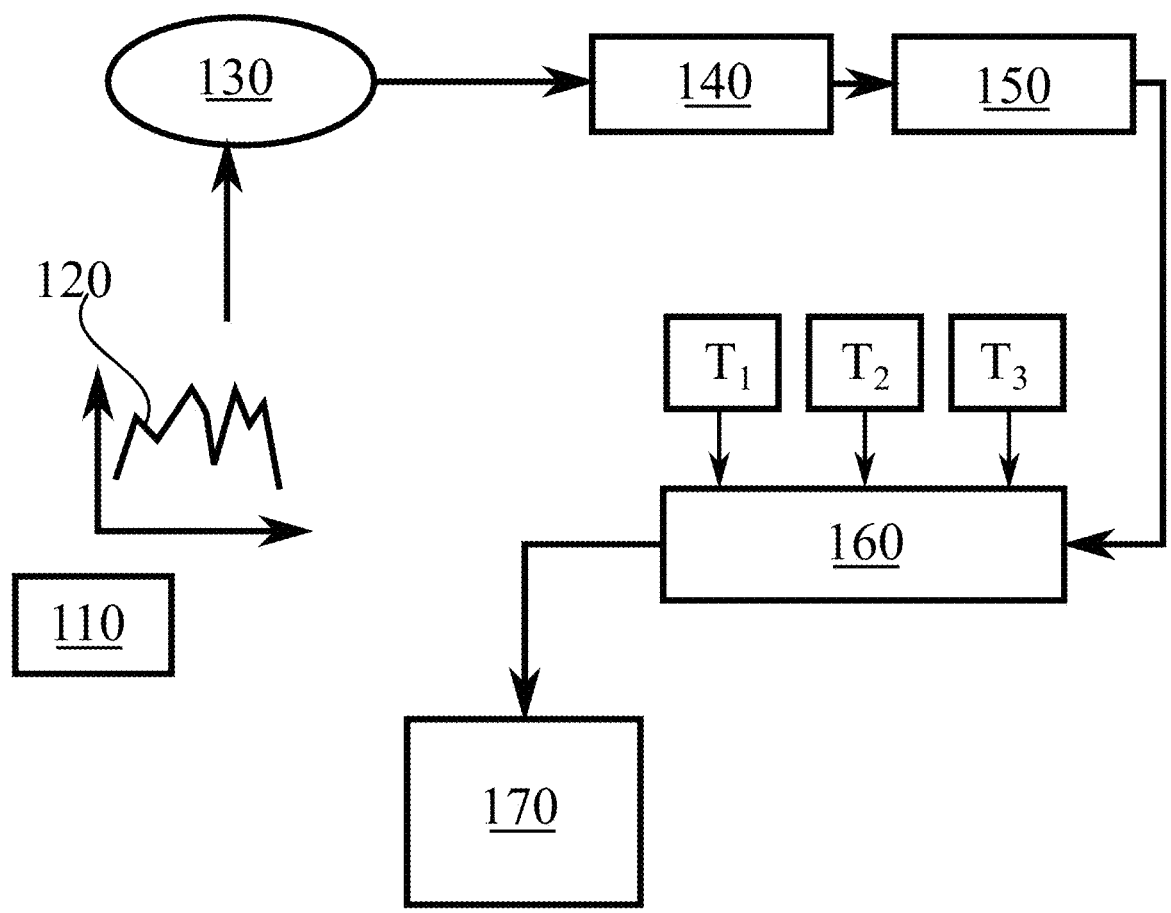
FIG. 1 illustrates an example embodiment in accordance with at least some embodiments of the present invention.

FIG. 1 illustrates an example embodiment in accordance with at least some embodiments of the present invention. Utility unit 110 may comprise, for example, at least one of a home, an industrial facility, a business and a medical facility. Utility unit 110 may in general be metered in terms of usage of a utility. In some cases, the utility unit corresponds to an entity whose utility usage is measured using one utility usage meter. Utility usage meters may comprise measurement apparatuses configured to perform measurements on usage of the utility in the utility unit. Examples include electrical meters and water usage meters.

The utility usage meters may be remotely readable in the sense that their measurement results may be obtained using a technical process without visiting the utility unit. For example, the utility usage meters may be interfaced with the Internet, and/or they may be equipped with an identity of a cellular communication network, enabling downloading of the measurement results over Internet and/or the cellular communication network, respectively. Utility meters may be connected via a low power wide area network, LPWAN. Further options include wireless mesh networks, licensed radio or power line connectivity.

The utility usage may comprise usage of at least one of electricity, water, heat and gas. In the system of FIG. 1, a utility usage measurement result is illustrated as data 120. Data 120 may correspond, for example, to hourly or daily utility usage information. Higher temporal resolutions may be possible, such as minutely or even secondly usage information, all the way to megahertz sampling rates, where applicable. A sharp transition from one usage level to another may comprise transition effects visible in high-resolution data, which may be useful in classifying the dataset. The resolution which is available may depend on utility usage meters and their characteristics. For example, where the utility comprises electricity and the data is hourly, a one-day dataset may comprise a set of 24 electrical usage data points, usable in determining how the usage of electricity varies as a function of the time of day in utility unit 110. The schematic coordinate axes illustrated in FIG. 1 may correspond to time on the horizontal axis, and a utility usage rate or a used utility quantity per time interval on the vertical axis.

Cloud 130 is one example of a storage location for the measurement results obtained from utility metering in utility unit 110. Alternatively to a cloud storage, a data server operated by the utility provider may be employed as a storage location, for example. For example, the measurement results may be updated to cloud 130 daily, weekly, monthly or constantly. The measurement results may be used for billing for utility use, for example, in addition to the uses specifically described herein in the context of the present disclosure. The connection between utility unit 110 and cloud 130, or another storage location, may comprise the Internet and/or a cellular communication network, for example. LPWAN connectivity is also possible.

To enable classification, data 120 is provided toward classifier 160 from the storage location, such as cloud 130. For example, a normalization function 140 may be employed on data 120 to render data sets originating from different sized utility units comparable to each other. Normalization may comprise adjusting amplitudes in data 120, for example. Data sets may originate from utility units of differing consumption volumes, such as high-consumption and low-consumption, wherefore normalization may be useful in making characteristics of the datasets more comparable to each other. A pre-processing function 150 may be employed to generate from the data in the storage location a data composition comprising utility usage information concerning the utility unit.

A data composition may be a weekly data composition reflecting utility usage over the course of a calendar week, or alternatively over a compiled week which comprises an averaged Monday obtained from averaging all Mondays over a month or a year, and likewise averages obtained for other days of the week. Alternatively or additionally, the data composition may be a monthly data composition and/or a week-endly data composition. These may likewise comprise data from a set calendar period, or a compilation of averaged days. In the case of a monthly or yearly data composition, this composition may comprise a set of averaged weeks over the course of the month or year. The data composition may also be done on weekdays basis, in addition to weekly and week-endly bases. The data composition may also be done as weighted average, such as time-decaying weighted average, where more recent samples are given higher weights, or time-window weighted average, where average is limited to a short past. In general, and more mathematically flexible way, applying infinite impulse response, IIR, or finite impulse response, FIR, filter to create output data composition.

Normalization 140 and pre-processing 150 may be optional in the sense that some embodiments of the present invention may be configured to provide data 120 to classifier 160 essentially without employing these functions. In this sense, data 120 may also be seen as a data composition. Depending on the type of classifier used, the classifier may be capable of handling un-normalized data, for example an artificial neural network may be able to perform well with data of differing amplitudes. Indeed an artificial neural network may be able to use the differing amplitudes to improve its classification results.

In some embodiments, at least two of the storage location, normalization function 140, pre-processing function 150 and classifier 160 are performed by a same apparatus. In some embodiments, all of the storage location, normalization function 140, pre-processing function 150 and classifier 160 are performed by a same apparatus.

Classifier 160 may be configured to determine, for a data composition it receives as input, a category comprising a life condition present in utility unit 110. To enable this, classifier 160 may be trained using training data $T_1$, $T_2$, $T_3$ prior to use in a live, runtime classification decision. Use of pre-classified training data $T_1$, $T_2$, $T_3$ to optimize classifier parameters of classifier 160 prior to use in a live classification task may be referred to as supervised learning. Some embodiments of the invention may employ unsupervised learning, where the training data is not pre-classified. Either way, optimized classifier parameters are obtained as a result of the training process. These classifier parameters are then used by classifier 160 to determine the classification result, that is the category, for incoming data compositions.

Classifier 160 may be of a type comprised in the following list: a support vector machine, SVM, an artificial neural network, a linear classifier, a quadratic classifier and a kernel estimator. In general, the classifier may be a machine learning statistical classifier.

The life condition may comprises at least one of the following: whether the utility unit is occupied by humans, whether humans in the utility unit are healthy, whether the utility unit is occupied by a teen-aged human, whether the utility unit is occupied by at least one toddler, whether humans in the utility unit watch television in excess of a first threshold time per day, whether humans in the utility unit play video games in excess of a second threshold time per day, and whether humans inhabiting the utility unit are employed outside of the utility unit.

The life condition may comprise, for example, that there is a health-critical device in the utility unit which requires a reliable supply of electricity. An interruption of electricity to such a device may endanger lives. Examples of health-critical devices include defibrillators and breathing assist apparatuses. A home may contain a breathing assist apparatus when a patient is in an outpatient setting, for example. In general, such a life condition may be expressed as a utility non-interruption priority condition. Another example of a utility non-interruption priority condition is a life condition where several young children live in the utility unit.

The training of classifier 160 may be based, for example, on minimization of a loss function. A loss function may be a function of the classifier parameters, wherefore its minimization may thus become a multidimensional minimization problem, which is well known in mathematics. For example, the gradient descent method, Newton's method or the Levenberg-Marquardt algorithm may be employed to find the classifier parameter values that correspond to a minimum of the loss function, and which therefore are the optimized classifier parameter values. Backpropagation may be employed, where appropriate, to improve the training process.

In a trained classifier, the classifier parameters are optimized and classifier 160 is then enabled to determine the category for an incoming data composition. The determined category is provided to decision stage 170, which may initiate actions as a response to the determined category and life condition of the category.

Examples of initiatable actions comprise a modification in a utility delivery network as a response to the determined category. The modification of the utility delivery network may comprise increasing or decreasing a priority of utility unit 110 in receiving the utility through the network, for example where a failure condition limits the ability of the utility network to deliver the utility and utility units must be prioritized. For example, the non-interruption priority condition may trigger an increase in priority of utility unit 110, to ensure life is not put at risk in case of failures in the utility network. Likewise, in case the life condition is that a utility unit is uninhabited, the priority if receiving the utility may be decreased.

Another example of a modification of the utility delivery network is a purposeful interruption of delivering the utility to utility unit 110. This may be useful where it is determined that a serious short circuit in utility unit 110 drains power from an electrical grid, or, for example, or where the category comprises likely illegal activities at utility unit 110, such as running of a uranium enrichment centrifuge, or unlicensed radio station. An enrichment centrifuge might cause a public danger due to leaks of toxic chemicals, and an unlicensed radio station interferes with frequency allocations in the radio spectrum.

In general, a modification of the utility delivery network may comprise a change of at least one parameter in the utility delivery network outside of utility units which consume the utility through the utility delivery network. A specific example is where a utility non-interruption priority condition would normally trigger an increase in priority of utility unit 110 in receiving the utility, but where it is also determined, based on the data composition, that an electric car is present and charging in the utility unit, the increase in priority may be cancelled since the electric car's battery may be used as a reserve power supply in utility unit 100 for a time.

Further examples of actions initiatable as a response to the determined category and life condition include utility use advice which may be issued to utility unit 110, for example concerning advantageous ways to use the utility in case the category indicates sub-optimal utility usage. Further, promotions may be provided to guide users to use the utility in ways that are more advantageous to the utility, for example, electricity may be offered at a cheaper rate at night-time to ease consumption peaks. Further, cable television subscriptions may be offered to households where television is watched, insurances may be marketed based on behaviours identified based on the category, health services and/or health notifications may be promoted based on identified behaviours, and gifts selected based on identified areas of interest may be sent.

Optionally, input data to classifier 160 may be stored in a suitable data storage entity. This data may be usable for re-training the classifier at a later point in time, to adapt to changing use patterns in the area. As another option, classifier 160 may take as input a time series of inputs. To enable this, the inputs may be accumulated before providing them to classifier 160, to build a suitable time series.

Figure 2:
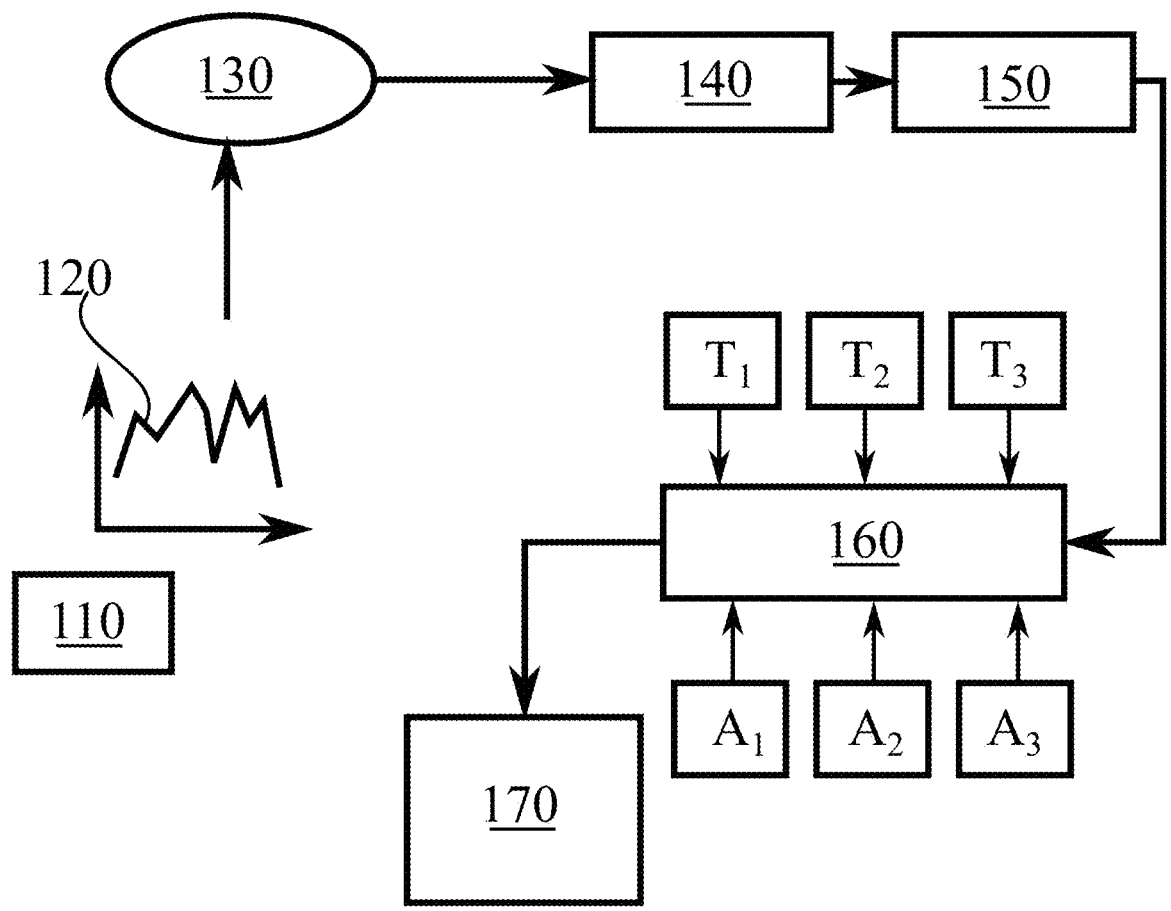
FIG. 2 illustrates an example embodiment in accordance with at least some embodiments of the present invention.

FIG. 2 illustrates an example embodiment in accordance with at least some embodiments of the present invention. Like numbering denotes like structure as in FIG. 1. In FIG. 2, classifier 160 received inputs, in addition to the training data during training and the data composition during runtime, from at least one supplementary information source $A_1, A_2, A_3$. The supplementary information may comprise, for example, at least one of the following: weather information, regional information, demographic information, age information, income information, social media information, Internet use information and sensor data originating in at least one sensor in the utility unit.

Sensor data originating in utility unit 110 may comprise, for example, indoor temperature data, humidity data, air quality measurements, motion sensor data, wearable sensor data and/or health sensor data.

The supplementary information may comprise third-party consumer information which may be aggregated and correlated with specific utility units. For example, rental services, online shopping, travel services and other services. In such cases, a second pre-processing may be possible which disaggregates utility consumption to categories or appliance categories, transforming the time domain data 120 to category vector domain. Additional pre-processing may be possible which disaggregates utility consumption to categories or appliance categories, transforming the combined consumption scalar data 120 to vector of category consumptions data. The classification could then take those vectors as supplementary inputs. Additional pre-processing may be done to transform time domain consumption data 120 to frequency domain data using discrete fourier transform, DFT, and/or fast fourier transform, FFT, windowed around a suitable time window. Those can also be used to provide supplementary inputs to the classifier.

The supplementary information may be used, for example, during both training the classifier and during runtime, when classifying data compositions. As the classifier has more information to provide context, the classification decisions may be more accurate, enabling more powerful and accurate use of data 120. Specifically sensor data may be used either in training and runtime, or, alternatively, only at runtime in assisting classification. For example, where motion sensor data indicates no-one has been in a utility unit for a time period, this utility unit may be classified as uninhabited, or classifier 160 may be caused to weight the uninhabited life condition in determining the category, to more likely arrive in the category corresponding to the uninhabited life condition when performing the classification.

In various embodiments, the classifier parameters may be re-optimized periodically, such as monthly, quarterly or annually, for example, to take account of changes in utility usage habits, and to enable integration of the classification with new kinds of supplementary information which becomes available. Initially, when the classifier parameters have not yet been trained for a specific area, classifier parameters trained for another area may be used as a baseline guess.

A device running the classifier may be located in a control room of a utility network, for example, or at a remote site. In some embodiments, a server unit is configured to classify utility units for plural utility networks, the server unit being distinct from the utility networks themselves. Such a server unit may run several different classifiers, with different classifier parameter sets, for the plural disparate utility networks. The disparate utility networks may be utility networks of different type, such as electrical and water delivery networks.

Figure 3:
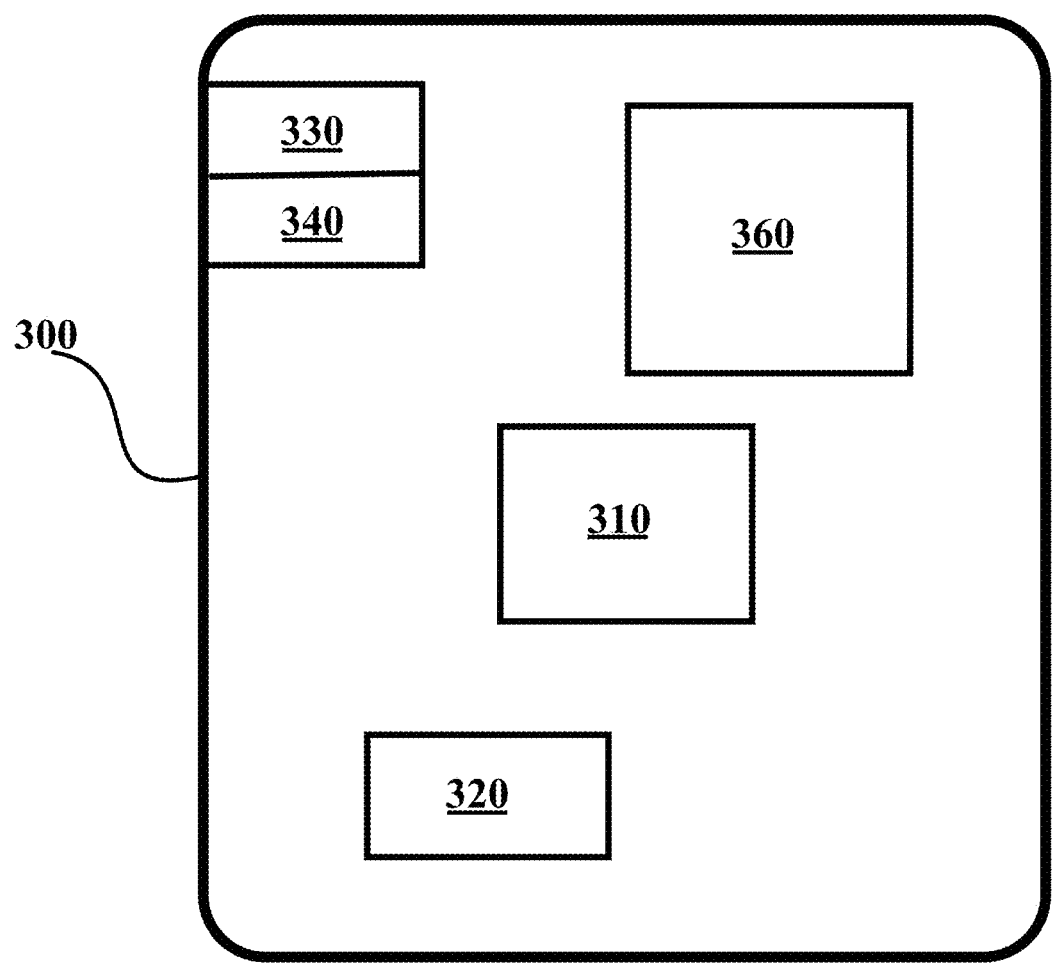
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a device running classifier 160 of FIG. 1 or FIG. 2. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured of ARM Holdings or a Steamroller processing core produced by Advanced Micro Devices Corporation. Processor 310 may comprise at least one AMD Opteron and/or Intel Xeon processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with wireless local area network, WLAN, Ethernet and/or worldwide interoperability for microwave access, WiMAX, standards, for example.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to configure classifier performance.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver. Device 300 may have network connections to the Internet, for example.

Device 300 may comprise further devices not illustrated in FIG. 3. For example, where device 300 comprises a server computer, it may comprise at least one duplicated hard drive system. Device 300 may comprise a fingerprint sensor arranged to authenticate, at least in part, a user of device 300. In some embodiments, device 300 lacks at least one device described above. Where device 300 is a server computer, it may communicate over a network and/or an Internet connection with a client computer to facilitate the user interface UI 360 and the authentication interface like the fingerprint reader through the client computer. The server computer may also be a virtual machine in the cloud, such as amazon web service, AWS, instance or Microsoft Azure instance.

Processor 310, memory 320, transmitter 330, receiver 340 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
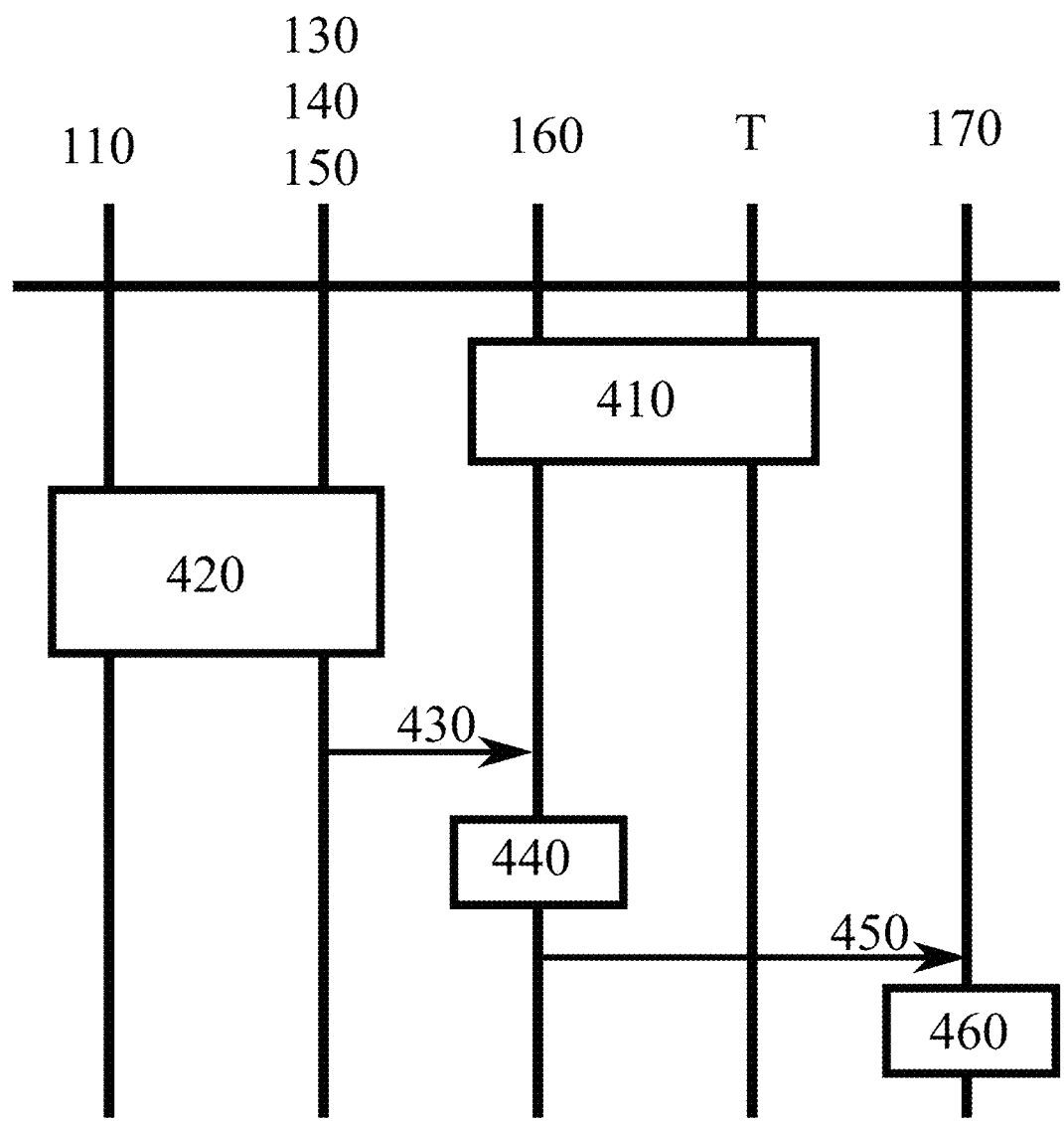
FIG. 4 illustrates signalling in accordance with at least some embodiments of the present invention.

FIG. 4 illustrates signalling in accordance with at least some embodiments of the present invention. On the vertical axes are disposed, from the left to the right, utility unit 110 of FIG. 1, then the cloud 130, normalization function 140 and pre-processing function 150 in a combined axis, classifier 160, training data T, and finally decision stage 170. Time advances from the top toward the bottom.

In stage 410, classifier parameters of classifier 160 are optimized in a training process, using training data T in a supervised or unsupervised learning process.

In stage 420, data on utility consumption at utility unit 110 is collected, stored and, optionally, also normalized and pre-processed where these functions are present. In stage 430, a data composition concerning utility unit 110 is provided to classifier 160 for classifying. In stage 440, classifier 160 performs the requested classification by determining a category for the data composition received in classifier 160 in stage 430. The category may correspond to a life condition pertaining to utility unit 110. Examples of suitable life conditions have been described herein above.

In stage 450 the classification decision is provided to decision stage 170, which initiates an action responsive to the classification decision in stage 460. Examples of suitable initiatable actions have been described herein above.

Figure 5:
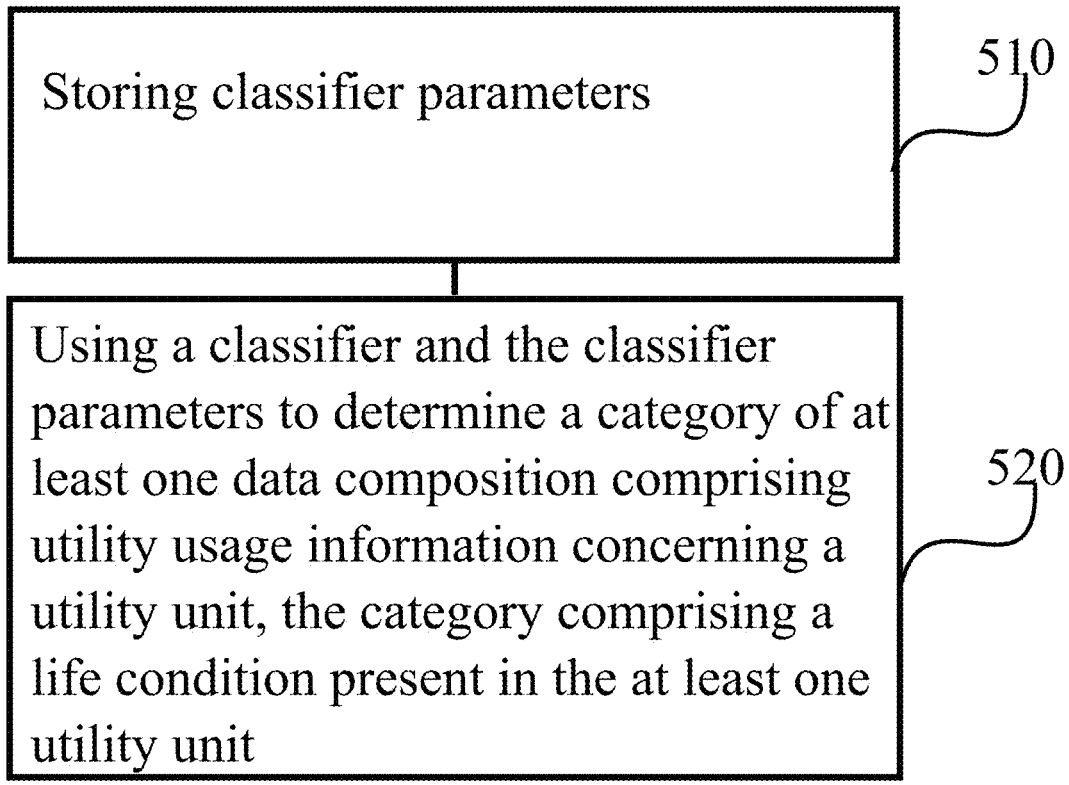
FIG. 5 is a flow graph of a method in accordance with at least some embodiments of the present invention.

FIG. 5 is a flow graph of a method in accordance with at least some embodiments of the present invention. The phases of the illustrated method may be performed in a device configured to run the classifier 160 of FIG. 1 and/or FIG. 2, for example.

Phase 510 comprises storing classifier parameters. Phase 520 comprises using a classifier and the classifier parameters to determine a category of least one data composition, the at least one data composition comprising utility usage information concerning a utility unit, the category comprising a life condition present in the at least one utility unit.

Figure 6:
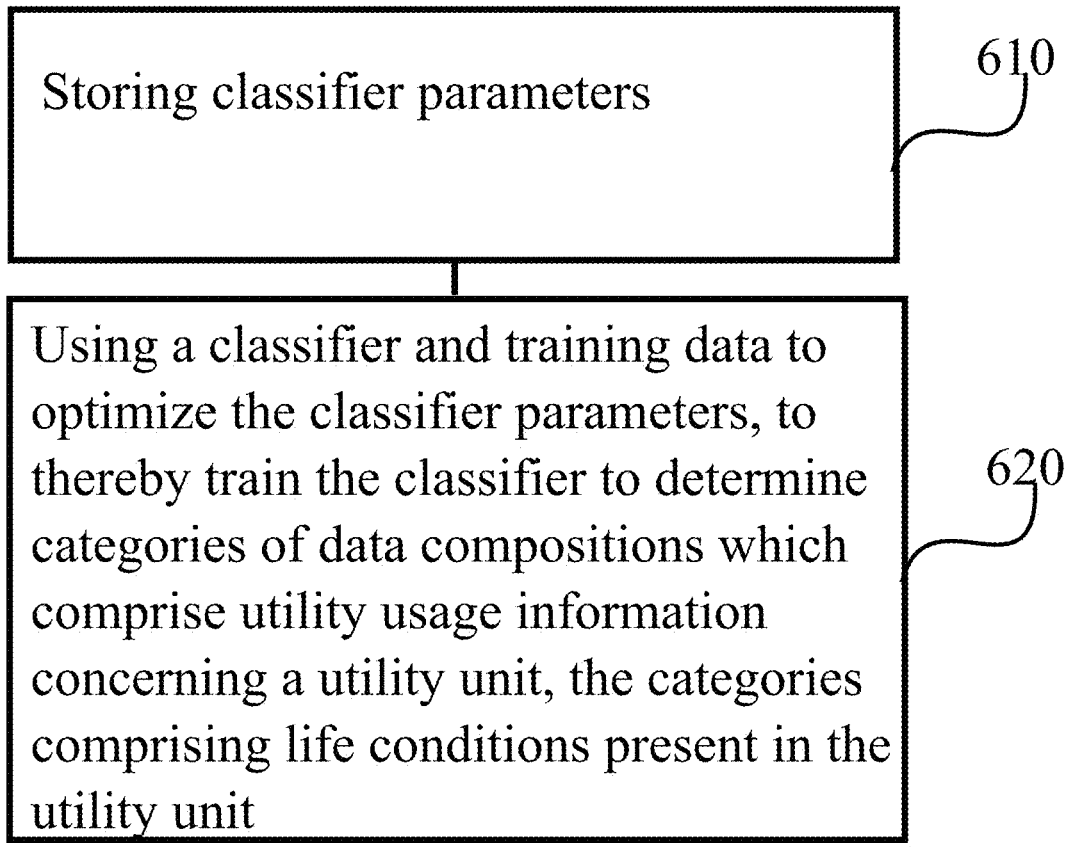
FIG. 6 is a flow graph of a method in accordance with at least some embodiments of the present invention.

FIG. 6 is a flow graph of a method in accordance with at least some embodiments of the present invention. The phases of the illustrated method may be performed in a device configured to run the classifier 160 of FIG. 1 and/or FIG. 2, for example.

Phase 610 comprises storing classifier parameters. Phase 620 comprises using a classifier and training data to optimize the classifier parameters, to thereby train the classifier to determine categories of data compositions which comprise utility usage information concerning a utility unit, the categories comprising life conditions present in the utility unit.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in optimizing the operation of utility delivery networks, for example in case of failure conditions.

ACRONYMS LIST

FIR finite impulse response
IIR infinite impulse response
LPWAN low power wide area network
SVM support vector machine
UPS Uninterruptible power supply

| REFERENCE SIGNS LIST | |
|---|---|
| 110 | Utility unit |
| 120 | Data |
| 130 | Cloud |
| 140 | Normalization function |
| 150 | Pre-processing function |
| 160 | Classifier |
| 170 | Decision stage |
| 300-360 | Structure of the device of FIG. 3 |
| 410-460 | Phases of the method of FIG. 4 |
| 510-520 | Phases of the method of FIG. 5 |
| 610-620 | Phases of the method of FIG. 6 |

The invention claimed is:

1. An apparatus comprising:
a memory configured to store classifier parameters, and
at least one processing core configured to use a classifier and the classifier parameters to determine a category of at least one data composition, the at least one data composition comprising utility usage information concerning a utility unit, the category comprising a life condition present in the at least one utility unit, wherein the life condition comprises at least one of: whether the utility unit is occupied by humans, whether the utility unit is occupied by a teen-aged human, whether the utility unit is occupied by at least one toddler, whether humans in the utility unit watch television in excess of a first threshold time per day, whether humans in the utility unit play video games in excess of a second threshold time per day and whether humans inhabiting the utility unit are employed outside of the utility unit, the apparatus being further configured to trigger a modification in a utility delivery network as a response to the determined category, wherein the modification in the utility delivery network comprises either prioritizing higher the utility unit, thereby decreasing risk that the utility unit experiences an interruption in receiving the utility, or prioritizing lower the utility unit.

2. The apparatus according to claim 1, wherein the at least one processing core is further configured to use, by the classifier, supplementary information along with the classifier parameters in determining the category.

3. The apparatus according to claim 2, wherein the supplementary information comprises at least one of the following: weather information, regional information, demographic information, age information, income information, social media information, third-party consumer information, Internet use information and sensor data originating in at least one sensor in the utility unit.

4. The apparatus according to claim 1, wherein the prioritizing comprises allocating remaining resources to the utility unit in case of a failure condition that reduces a baseline amount of deliverable utility resources.

5. The apparatus according to claim 1, wherein the modification in the utility delivery network comprises interrupting delivery of the utility to the utility unit.

6. The apparatus according to claim 1, wherein the utility unit comprises at least one of a home, an industrial facility, a business and a medical facility.

7. The apparatus according to claim 1, wherein the utility usage comprises usage of at least one of: electricity, water, heat, data connectivity and gas.

8. The apparatus according to claim 1, wherein the classifier is comprised in the following list: a support vector machine, an artificial neural network, a linear classifier, a quadratic classifier, a kernel estimator, a decision tree, a K-nearest neighbour classifier, a random forest, and a Bayesian network.

9. A method comprising:
storing classifier parameters, and
using a classifier and the classifier parameters to determine a category of at least one data composition, the at least one data composition comprising utility usage information concerning a utility unit, the category comprising a life condition present in the at least one utility unit, wherein the life condition comprises at least one of: whether the utility unit is occupied by humans, whether the utility unit is occupied by a teen-aged human, whether the utility unit is occupied by at least one toddler, whether humans in the utility unit watch television in excess of a first threshold time per day, whether humans in the utility unit play video games in excess of a second threshold time per day and whether humans inhabiting the utility unit are employed outside of the utility unit, the method further comprising triggering a modification in a utility delivery network as a response to the determined category, wherein the modification in the utility delivery network comprises either prioritizing higher the utility unit, thereby decreasing risk that the utility unit experiences an interruption in receiving the utility, or prioritizing lower the utility unit.

10. The method according to claim 9, further comprising using, by the classifier, supplementary information along with the classifier parameters in determining the category.

11. The method according to claim 10, wherein the supplementary information comprises at least one of the following: weather information, regional information, demographic information, age information, income information, social media information, third-party consumer information, Internet use information and sensor data originating in at least one sensor in the utility unit.

12. The method according to claim 9, wherein the prioritizing comprises allocating remaining resources to the utility unit in case of a failure condition that reduces a baseline amount of deliverable utility resources.

13. The method according to claim 9, wherein the modification in the utility delivery network comprises interrupting delivery of the utility to the utility unit.

14. The method according to claim 9, wherein the utility unit comprises at least one of a home, an industrial facility, a business and a medical facility.

15. The method according to claim 9, wherein the utility usage comprises usage of at least one of: electricity, water, heat, data connectivity and gas.

16. The method according to claim 9, wherein the classifier is comprised in the following list: a support vector machine, an artificial neural network, a linear classifier, a quadratic classifier, a kernel estimator, a decision tree, a K-nearest neighbour classifier, a random forest, and a Bayesian network.

17. A non-transitory computer readable medium having stored thereon a set of computer readable instructions that, when executed by at least one processor, cause an apparatus to at least:
store classifier parameters, and
use a classifier and the classifier parameters to determine a category of at least one data composition, the at least one data composition comprising utility usage information concerning a utility unit, the category comprising a life condition present in the at least one utility unit, wherein the life condition comprises at least one of: whether the utility unit is occupied by humans, whether the utility unit is occupied by a teen-aged human, whether the utility unit is occupied by at least one toddler, whether humans in the utility unit watch television in excess of a first threshold time per day, whether humans in the utility unit play video games in excess of a second threshold time per day and whether humans inhabiting the utility unit are employed outside of the utility unit, the computer readable instructions being further configured to cause the apparatus to trigger a modification in a utility delivery network as a response to the determined category, wherein the modification in the utility delivery network comprises either prioritizing higher the utility unit, thereby decreasing risk that the utility unit experiences an interruption in receiving the utility, or prioritizing lower the utility unit.

* * * * *